US008953914B2

(12) United States Patent
Genier (10) Patent No.: US 8,953,914 B2
(45) Date of Patent: Feb. 10, 2015

(54) LIGHT DIFFUSING FIBERS WITH INTEGRATED MODE SHAPING LENSES

(71) Applicant: Corning Incorporated, Corning, NY (US)

(72) Inventor: Michael Lucien Genier, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 46 days.

(21) Appl. No.: 13/924,972

(22) Filed: Jun. 24, 2013

(65) Prior Publication Data

US 2013/0343703 A1 Dec. 26, 2013

Related U.S. Application Data (60) Provisional application No. 61/664,349, filed on Jun. 26, 2012.

(51) Int. Cl.
G02B 6/32 (2006.01)

(52) U.S. Cl.
CPC .................................. G02B 6/32 (2013.01)
USPC .......................................................... 385/33

(58) Field of Classification Search
USPC .......................................................... 385/33
See application file for complete search history.

(56) References Cited

U.S. PATENT DOCUMENTS

| 6,549,704 | B2 | 4/2003 | Ukrainczyk |
| 6,904,197 | B2 | 6/2005 | Bhagavatula et al. |
| 6,963,682 | B2 | 11/2005 | Bhagavatula et al. |
| 7,062,135 | B2 | 6/2006 | Caracci et al. |
| 7,228,033 | B2 | 6/2007 | Bhagavatula et al. |
| 7,450,806 | B2 | 11/2008 | Bookbinder et al. |
| 7,539,382 | B2 * | 5/2009 | Skovgaard et al. ........... 385/125 |

FOREIGN PATENT DOCUMENTS

WO 02/103424 12/2002

* cited by examiner

Primary Examiner — Uyen Chau N Le
Assistant Examiner — Hoang Tran
(74) Attorney, Agent, or Firm — Gregory V. Bean (57) ABSTRACT

A method including the steps of providing a light-diffusing optical fiber (12a) having a glass core (20), a cladding (40) surrounding the core (20), and a plurality of nano-sized structures in the form of voids (32) situated within said core (20) or at a core-cladding boundary; cleaving the light-diffusing fiber (12a), thereby forming a cleaved end face (66); and applying energy to one or more of 1) the cleaved end face (66) and 2) the light-diffusing fiber (12b) along a portion of the length thereof adjacent the cleaved end face (66), the amount of energy being sufficient to collapse and seal the voids (32) exposed at the cleaved end face (66), leaving a sealed cleaved end face (68). A lens may then be attached to the sealed cleaved end face (68), or the sealed cleaved end face (68) may be softened sufficiently to induce formation of a lensing surface such as a convex lensing surface (60) on the sealed end face (68).

9 Claims, 9 Drawing Sheets

LIGHT DIFFUSING FIBERS WITH INTEGRATED MODE SHAPING LENSES

This application claims the benefit of priority under 35 U.S.C. §119 of U.S. Provisional Application Ser. No. 61/664,349 filed on Jun. 26, 2012 the content of which is relied upon and incorporated herein by reference in its entirety.

FIELD

The present disclosure relates generally to light-diffusing optical fibers having a region with nano-sized structures, and in particular to light-diffusing optical fibers having a region with nano-sized structures equipped with integral or integrated lenses.

TECHNICAL BACKGROUND

Optical fibers are used for a variety of applications where light needs to be delivered from a light source to a remote location. Optical telecommunication systems, for example, rely on a network of optical fibers to transmit light from a service provider to system end-users.

Telecommunication optical fibers are designed to operate at near-infrared wavelengths in the range from 800 nm to 1675 nm where there are only relatively low levels of attenuation due to absorption and scattering. This allows most of the light injected into one end of the fiber to exit the opposite end of the fiber with only insubstantial amounts exiting peripherally through the sides of the fiber.

Recently, there has been a growing need to have optical fibers that are less sensitive to bending than conventional fibers. This is because more and more telecommunication systems are being deployed in configurations that require the optical fiber to be bent tightly. This need has lead to the development of optical fibers that utilize a ring of small non-periodically disposed voids that surround the core region. The void containing ring serves to increase the bend insensitivity—that is to say, the fiber can have a smaller bend radius without suffering a significant change in the attenuation (loss) of the optical signal passing through. In these fibers the void containing ring region is placed in the cladding of the optical fiber some distance from the core in order to minimize amount of light propagation through void containing ring region, since this could increase optical loss.

Because optical fibers are typically designed to efficiently deliver light from one end of the fiber to the other end of the fiber over long distances, very little light escapes from the sides of the typical fiber, and, therefore optical fibers are not considered to be well-suited for use in forming an extended illumination source. Yet, there are a number of illumination system applications where select amounts of light, often at specific wavelengths, need to be provided in an efficient and convenient manner to specified areas.

SUMMARY

According to some aspects of the present disclosure, a method is provided including the steps of: providing a light-diffusing optical fiber having a glass core, a cladding surrounding the core, and a plurality of nano-sized structures in the form of voids situated within said core or at a core-cladding boundary; cleaving the light-diffusing fiber, thereby forming a cleaved end face; and applying energy to one or more of 1) the cleaved end face and 2) the light-diffusing fiber (12b) along a portion of the length thereof adjacent the cleaved end face, the amount of energy being sufficient to collapse and seal the voids exposed at the cleaved end face, leaving a sealed cleaved end face. A lens may then be attached to the sealed cleaved end face, such as by heat fusion, or the sealed cleaved end face may be softened sufficiently to induce formation of a lensing surface such as a convex lensing surface on the sealed end face.

According to some other aspects of the present disclosure, a method is provided including the steps of: providing a light-diffusing optical fiber having a glass core, a cladding surrounding the core, and a plurality of nano-sized structures situated within said core or at a core-cladding boundary; applying energy to the light-diffusing fiber, along a portion of the length thereof, the amount of energy being sufficient to collapse and seal the voids along said portion of the length; cleaving the light-diffusing fiber inside said portion of the length, thereby forming a sealed cleaved end face on the light-diffusing fiber. A lens may then be attached to the sealed cleaved end face, such as by heat fusion, or the sealed cleaved end face may be softened sufficiently to induce formation of a lensing surface such as a convex lensing surface on the sealed end face.

By these methods and others disclosed herein, A light-diffusing fiber may be formed, the fiber having a first end and comprising a glass core, a cladding surrounding said core, a plurality of nano-sized structures situated within said core or at a core-cladding boundary; and a lens on said first end, wherein the plurality of nano-sized structures are sealed off at or near said first end so as not to extend up to or into said lens. With such a fiber, the lens at the end of the fiber can hove good optical properties not distorted by any of the nano-sized structures, and the lens can be integrally formed from the fiber or can be heat fused to the fiber or otherwise well attached to the fiber to form a permanently lensed fiber end. Also, the sealed voids are protected in the disclosed lensed fiber from debris or other contamination, thus preserving the properties of the fiber at or near the lens.

It is to be understood that both the foregoing general description and the following detailed description represent embodiments of the disclosure, and are intended to provide an overview or framework for understanding the nature and character of the disclosure as it is claimed. The accompanying drawings are included to provide a further understanding of the disclosure, and are incorporated into and constitute a part of this specification. The drawings illustrate various embodiments of the disclosure and together with the description serve to explain the principles and operations of the disclosure.

Additional features and advantages of the disclosure will be set forth in the detailed description which follows, and in part will be readily apparent to those skilled in the art from that description or recognized by practicing the disclosure as described herein, including the detailed description which follows, the claims, as well as the appended drawings. The claims are incorporated into and constitute part of the Detailed Description set forth below.

Additional features and advantages of the disclosure will be set forth in the detailed description which follows and will be apparent to those skilled in the art from the description or recognized by practicing the disclosure as described in the following description together with the claims and appended drawings.

DETAILED DESCRIPTION

Reference is now made in detail to the present preferred embodiments of the disclosure, examples of which are illustrated in the accompanying drawings. Whenever possible, like or similar reference numerals are used throughout the drawings to refer to like or similar parts. It should be understood that the embodiments disclosed herein are merely examples, each incorporating certain benefits of the present disclosure.

Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure, in view of but not limited to the embodiments described herein.

DEFINITIONS

Terms such as "horizontal," "vertical," "front," "back," etc., and the use of Cartesian Coordinates are for the sake of reference in the drawings and for ease of description and are not intended to be strictly limiting either in the description or in the claims as to an absolute orientation and/or direction.

In the description of the disclosure below, the following terms and phrases are used in connection with light-diffusing optical fibers having nano-sized structures.

The "refractive index profile" is the relationship between the refractive index or the relative refractive index and the waveguide (fiber) radius.

The "relative refractive index percent" is defined as $$\Delta(r)\% = 100 \times [n(r)^2 - n_{REF}^2]/2n(r)^2,$$

where n(r) is the refractive index at radius r, unless otherwise specified. The relative refractive index percent is defined at 850 nm unless otherwise specified. In one aspect, the reference index $n_{REF}$ is silica glass with the refractive index of 1.452498 at 850 nm, in another aspect is the maximum refractive index of the cladding glass at 850 nm. As used herein, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

The term "α-profile" or "alpha profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)\%$ is zero, and r is in the range $r_i \leq r \leq r_f$, where $\Delta$ is defined above, $r_i$ is the initial point of the α-profile, $r_f$ is the final point of the α-profile, and α is an exponent which is a real number.

As used herein, the term "parabolic" therefore includes substantially parabolically shaped refractive index profiles which may vary slightly from an α value of 2.0 at one or more points in the core, as well as profiles with minor variations and/or a centerline dip. In some exemplary embodiments, α is greater than 1.5 and less than 2.5, more preferably greater than 1.7 and 2.3 and even more preferably between 1.8 and 2.3 as measured at 850 nm. In other embodiments, one or more segments of the refractive index profile have a substantially step index shape with an α value greater than 8, more preferably greater than 10 even more preferably greater than 20 as measured at 850 nm.

The term "nano-structured fiber region" describes the fiber having a region or area with a large number (greater than 50) of gas filled voids, or other nano-sized structures, e.g., more than 50, more than 100, or more than 200 voids in the cross-section of the fiber. The gas filled voids may contain, for example, $SO_2$, Kr, Ar, $CO_2$, $N_2$, $O_2$, or mixture thereof. The cross-sectional size (e.g., diameter) of nano-sized structures (e.g., voids) as described herein may vary from 10 nm to 1 μm (for example, 50 nm-500 nm), and the length may vary from 1 millimeter to 50 meters (e.g., 2 mm to 5 meters, or 5 mm to 1 m range).

Figure 4A:
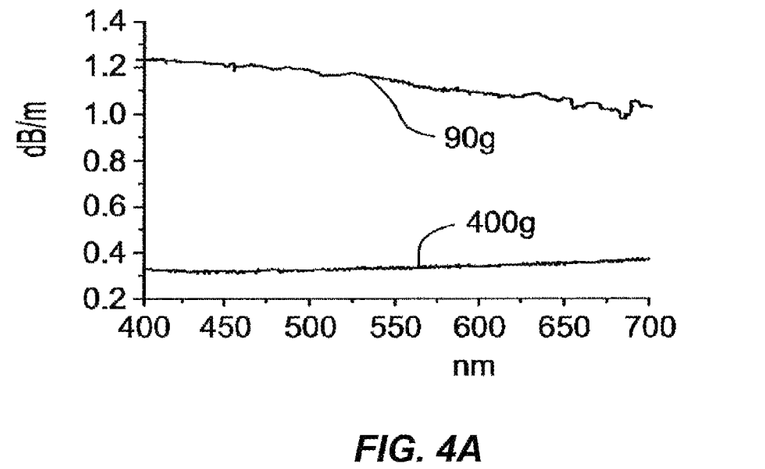
FIGS. 4A and 4B depict fiber attenuation (loss) in dB/m versus wavelength (nm)
Figure 4B:
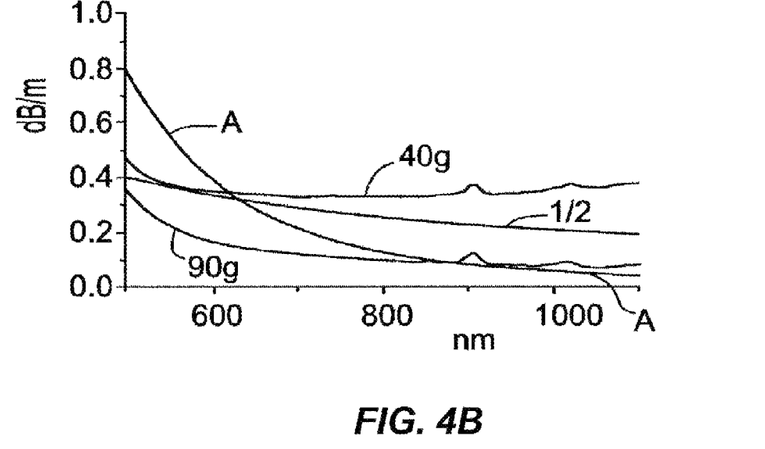

In standard single mode or multimode optical fibers, the losses at wavelengths less than 1300 nm are dominated by Rayleigh scattering. These Rayleigh scattering loss Ls is determined by the properties of the material and are typically about 20 dB/km for visible wavelengths (400-700 nm). Rayleigh scattering losses also have a strong wavelength dependence (i.e., $L_S \propto 1/\lambda^4$, see FIG. 4B, comparative fiber A), which means that at least about 1 km to 2 km of the fiber is needed to dissipate more than 95% of the input light. Shorter lengths of such fiber would result in lower illumination efficiency, while using long lengths (1 km to 2 km, or more) can be more costly and can be difficult to manage. Such long lengths of fiber may be cumbersome in an illumination system.

In certain configurations of lighting applications it is desirable to use shorter lengths of fiber, for example, 1-100 meters. This requires an increase of scattering loss from the fiber, while being able to maintain good angular scattering properties (uniform dissipation of light away from the axis of the fiber) and good bending performance to avoid bright spots at fiber bends. A desirable attribute of at least some of the embodiments of present disclosure described herein is uniform and high illumination along the length of the fiber illuminator. Because the optical fiber is flexible, it allows a wide variety of the illumination shapes to be deployed. It is preferable to have no bright spots (due to elevated bend losses) at the bending points of the fiber, such that the illumination provided by the fiber does not vary by more than 30%, preferably less than 20% and more preferably less than 10%. For example, in at least some embodiments, the average scattering loss of the fiber is greater than 50 dB/km, and the scattering loss does not vary more than 30% (i.e., the scattering loss is within ±30% of the average scattering loss) over any given fiber segment of 0.2 m length. According to at least some embodiments, the average scattering loss of the fiber is greater than 50 dB/km, and the scattering loss does not vary more than 30% over the fiber segments of less than 0.05 m length. According to at least some embodiments, the average scattering loss of the fiber is greater than 50 dB/km, and the scattering loss does not vary more than 30% (i.e., ±30%) over the fiber segments 0.01 m length. According to at least some embodiments, the average scattering loss of the fiber is greater than 50 dB/km, and the scattering loss does not vary more than 20%(i.e., ±20%) and preferably by not more than 10% (i.e., ±10%) over the fiber segments 0.01 m length.

In at least some embodiments, the intensity variation of the integrated (diffused) light intensity coming through sides of the fiber at the illumination wavelength is less than 30% for a target length of the fiber, which can be, for example, a 0.02 to 100 m length. It is noted that the intensity of light through sides of the fiber at a specified illumination wavelength can be varied by incorporating fluorescence material in or on the cladding or coating. The wavelength of the light scattering by the fluorescent material is different from the wavelength of the light propagating in the fiber.

In some the following exemplary embodiments we describe fiber designs with a nano-structured fiber region (region with nano-sized structures) placed in the core area of the fiber, or very close to core. Some of the fiber embodiments have scattering losses in excess of 50 dB/km (for example, greater than 100 dB/km, greater than 200 dB/km, greater than 500 dB/km, greater than 1000 dB/km, greater than 3000 dB/km, greater than 5000 dB/km), the scattering loss (and thus illumination, or light radiated by these fibers) is uniform in angular space.

In order to reduce or to eliminate bright spots as bends in the fiber, it is desirable that the increase in attenuation at a 90° bend in the fiber is less than 5 dB/turn (for example, less than 3 dB/turn, less than 2 dB/turn, less than 1 dB/turn) when the bend diameter is less than 50 mm. In exemplary embodiment, these low bend losses are achieved at even smaller bend diameters, for example, less than 20 mm, less than 10 mm, and even less than 5 mm. Preferably, the total increase in attenuation is less than 1 dB per 90 degree turn at a bend radius of 5 mm.

Preferably, according to some embodiments, the bending loss is equal to or is lower than intrinsic scattering loss from the core of the straight fiber. The intrinsic scattering is predominantly due to scattering from the nano-sized structures. Thus, according to at least the bend insensitive embodiments of optical fiber, the bend loss does not exceed the intrinsic scattering for the fiber. However, because the scattering level is a function of bending diameter, the bending deployment of the fiber depends on its scattering level. For example, in some of the embodiments, the fiber has a bend loss less than 3 dB/turn, preferably less than 2 dB/turn, and the fiber can be bent in an arc with a radius as small as 5 mm radius without forming bright spots.

Also, in the description below, in some embodiments where it is said that scattered actinic light is provided or delivered throughout a photoreactive material, the scattered actinic light is assumed to have sufficient intensity to perform a photoreaction on the photoreactive material in a reasonable period of time.

Light-Diffusing Optical Fiber

Figure 1:
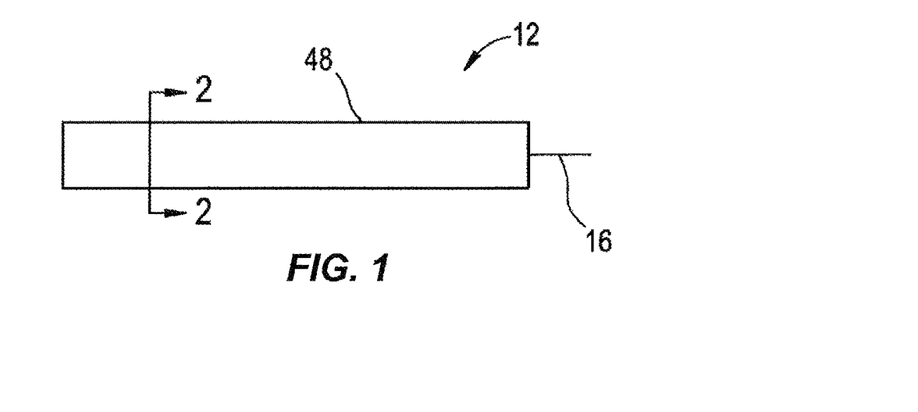
FIG. 1 is a schematic side view of a section of an example embodiment of light-diffusing optical fiber.
Figure 2:
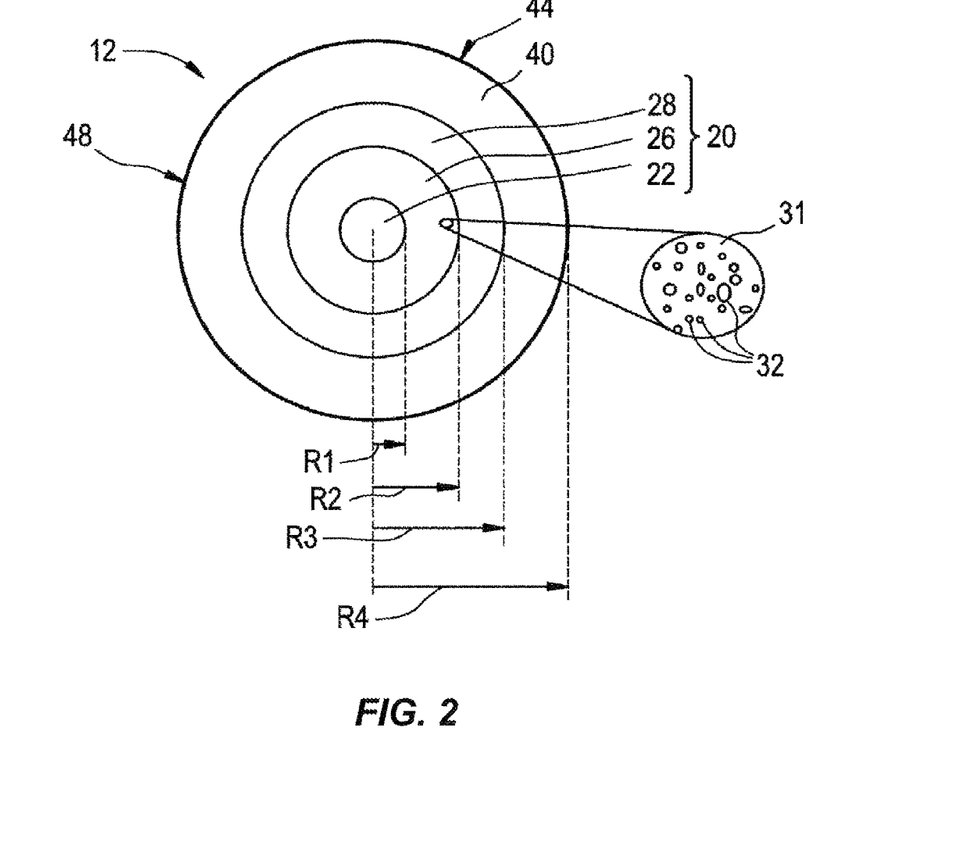
FIG. 2 is a schematic cross-section of the optical fiber of FIG. 1 as viewed along the direction 2-2.

FIG. 1 is a schematic side view of a section of an example embodiment of a light-diffusing optical fiber (also referred to hereinafter as "fiber") 12 having a central axis ("centerline") 16. FIG. 2 is a schematic cross-section of light-diffusing optical fiber 12 as viewed along the direction 2-2 in FIG. 1. Fiber 12 can be, for example, any one of the various types of optical fiber with a nano-structured fiber region having periodic or non-periodic nano-sized structures 32 (for example voids). In an example embodiment, fiber 12 includes a core 20 divided into three sections or regions. These core regions are: a solid central portion 22, a nano-structured ring portion (inner annular core region) 26, and outer, solid portion 28 surrounding the inner annular core region 26. A cladding region 40 ("cladding") surrounds the annular core 20 and has an outer surface. The cladding 40 may have low refractive index to provide a high numerical aperture (NA). The cladding 40 can be, for example, a low index polymer such as UV or thermally curable fluoroacrylate or silicone.

An optional coating 44 surrounds the cladding 40. Coating 44 may include a low modulus primary coating layer and a high modulus secondary coating layer. In at least some embodiments, coating layer 44 comprises a polymer coating such as an acrylate-based or silicone based polymer. In at least some embodiments, the coating has a constant diameter along the length of the fiber.

In other exemplary embodiments described below, coating 44 is designed to enhance the distribution and/or the nature of "radiated light" that passes from core 20 through cladding 40. The outer surface of the cladding 40 or the of the outer of optional coating 44 represents the "sides" or surface 48 of the fiber 12 through which light traveling in the fiber is made to exit via scattering, as described herein.

A protective cover or sheath (not shown) optionally covers cladding 40. Fiber 12 may include a fluorinated cladding 40, but the fluorinated cladding is not needed if the fibers are to be used in short-length applications where leakage losses do not degrade the illumination properties.

In some exemplary embodiments, the core region 26 of fiber 12 comprises a glass matrix ("glass") 31 with a plurality of non-periodically disposed nano-sized structures (e.g., "voids") 32 situated therein, such as the example voids shown in detail in the magnified inset of FIG. 2. In another example embodiment, voids 32 may be periodically disposed, such as in a photonic crystal optical fiber, wherein the voids typically have diameters between about $1 \times 10^{-6}$ m and $1 \times 10^{-5}$ m. Voids 32 may also be non-periodically or randomly disposed. In some exemplary embodiment, glass 31 in region 26 is fluorine-doped silica, while in other embodiment the glass is undoped pure silica. Preferably the diameters of the voids are at least 10 nm.

The nano-sized structures 32 scatter the light away from the core 20 and toward the outer surface 48 of the fiber. The scattered light is then "diffused" through of the outer surface 48 of the fiber 12 to provide the desired illumination. That is, most of the light is diffused (via scattering) through the sides of the fiber 12, along the fiber length. Preferably, the fiber emits substantially uniform radiation over its length, and the fiber has a scattering-induced attenuation of greater than 50 dB/km in the wavelength(s) of the emitted radiation (illumination wavelength). Preferably, the scattering-induced attenuation is greater than 100 dB/km for this wavelength. In some embodiments, the scattering-induced attenuation is greater than 500 dB/km for this wavelength, and in some embodiments is 1000 dB/km, greater than 2000 dB/km, and greater than 5000 dB/km. These high scattering losses are about 2.5 to 250 times higher than the Rayleigh scattering losses in standard single mode and multimode optical fibers.

The glass making up core regions 22 and 28 may include updopants, such as Ge, Al, and/or P. By "non-periodically disposed" or "non-periodic distribution," it is meant that when one takes a cross-section of the optical fiber (such as shown in FIG. 2), the voids 32 are randomly or non-periodically distributed across a portion of the fiber. Similar cross sections taken at different points along the length of the fiber will reveal different cross-sectional void patterns, i.e., various cross sections will have different voids patterns, wherein the distributions of voids and sizes of voids do not match. That is, the voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. While not wishing to be bound by theory, it is believed that the voids extend less than 10 meters, and in many cases less than 1 meter along the length of the fiber.

The fiber 12 as used herein in the illumination systems discussed below can be made by methods which utilize preform consolidation conditions which result in a significant amount of gases being trapped in the consolidated glass blank, thereby causing the formation of voids in the consolidated glass optical fiber preform. Rather than taking steps to remove these voids, the resultant preform is used to form an optical fiber with voids, or nano-sized structures, therein. The resultant fiber's nano-sized structures or voids are utilized to scatter or guide the light out of the fiber, via its sides, along the fiber length. That is, the light is guided away from the core 20, through the outer surface of the fiber, to provide the desired illumination.

As used herein, the diameter of a nano-sized structure such as void is the longest line segment whose endpoints a) when the optical fiber is viewed in perpendicular cross-section transverse to the longitudinal axis of the fiber. Method of making optical fibers with nano-sized voids is described, for example, in U.S. patent application Ser. No. 11/583,098, which is incorporated herein by reference.

As described above, in some embodiments of fiber 12, core sections 22 and 28 comprise silica doped with germanium, i.e., germania-doped silica. Dopants other than germanium, singly or in combination, may be employed within the core, and particularly at or near the centerline 16, of the fiber to obtain the desired refractive index and density. In at least some embodiments, the relative refractive index profile of the optical fiber disclosed herein is non-negative in sections 22 and 28. These dopants may be, for example, Al, Ti, P, Ge, or a combination thereof. In at least some embodiments, the optical fiber contains no index-decreasing dopants in the core. In some embodiments, the relative refractive index profile of the optical fiber disclosed herein is non-negative in sections 22, 26 and 28.

In some examples of fiber 12 as used herein, the core 20 comprises pure silica. In one embodiment, a preferred attribute of the fiber is the ability to scatter light out of the fiber (i.e., to diffuse light) in the desired spectral range that causes a photoreaction in a photoreactive material. In other embodiments, the scattered light may be used for virtually any illumination purposes, including general lighting elements, decorative accents, and white light applications. The amount of the loss via scattering can be increased by changing the properties of the glass in the fiber, the width of the nano-structured region 26, and the size and the density of the nano-sized structures.

In some examples of fiber 12 as used herein, core 20 is a graded-index core, and preferably, the refractive index profile of the core has a parabolic (or substantially parabolic) shape; for example, in some embodiments, the refractive index profile of core 20 has an α-shape with an α value of about 2, preferably between 1.8 and 2.3 as measured at 850 nm. In other embodiments, one or more segments of the refractive index profile have a substantially step index shape with an α value greater than 8, more preferably greater than 10 even more preferably greater than 20 as measured at 850 nm. In some embodiments, the refractive index of the core may have a centerline dip, wherein the maximum refractive index of the core, and the maximum refractive index of the entire optical fiber, is located a small distance away from centerline 16, but in other embodiments the refractive index of the core has no centerline dip, and the maximum refractive index of the core, and the maximum refractive index of the entire optical fiber, is located at the centerline.

In an exemplary embodiment, fiber 12 has a silica-based core 20 and depressed index (relative to silica) polymer cladding 40. The low index polymer cladding 40 preferably has a relative refractive index that is negative, more preferably less than −0.5% and even more preferably less than −1%. In some exemplary embodiments cladding 40 has thickness of 20 μm or more. In some exemplary embodiments cladding 40 has a lowed refractive index than than the core, and a thickness of 10 μm or more (e.g., 20 μm or more). In some exemplary embodiments, the cladding has an outer diameter 2 times Rmax, e.g., of about 125 μm (e.g., 120 μm to 130 μm, or 123 μm to 128 μm). In other embodiments the cladding has the diameter that is less than 120 μm, for example 60 or 80 μm. In other embodiments the outer diameter of the cladding is greater than 200 μm, greater than 300 μm, or greater than 500 μm. In some embodiments, the outer diameter of the cladding has a constant diameter along the length of fiber 12. In some embodiments, the refractive index of fiber 12 has radial symmetry. Preferably, the outer diameter R3 of core 20 is constant along the length of the fiber. Preferably the outer diameters of core sections 22, 26, 28 are also constant along the length of the fiber. By constant, we mean that the variations in the diameter with respect to the mean value are less than 10%, preferably less than 5% and more preferably less than 2%.

Figure 3A:
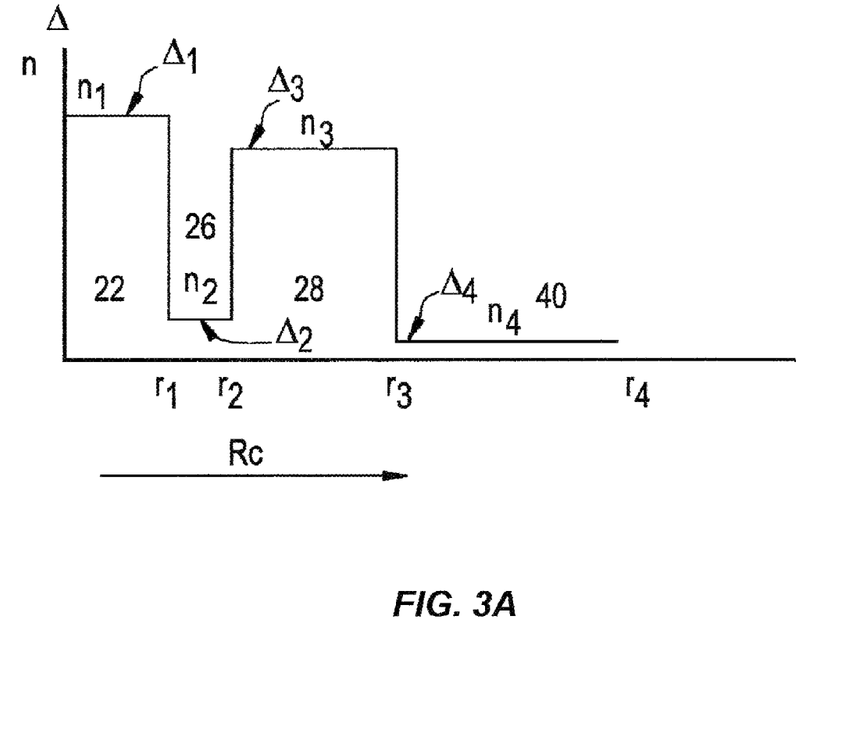
FIG. 3A is a schematic illustration of relative refractive index plot versus fiber radius for an exemplary embodiment of light-diffusing optical fiber.

FIG. 3A is a plot of the exemplary relative refractive index Δ versus fiber radius for an example fiber 12 shown in FIG. 2 (solid line). The core 20 may also have a graded core profile, characterized, for example, by an α-value between 1.7 and 2.3 (e.g., 1.8 to 2.3). An alternative exemplary refractive index profile is illustrated by the dashed lines. The solid central portion 22 of the core 20 (or first core region 22) extends radially outwardly from the centerline 16 to its outer radius, R1, and has a relative refractive index profile $\Delta_1(r)$ corresponding to a maximum refractive index n1 (and relative refractive index percent $\Delta_{1MAX}$). In this embodiment, the reference index $n_{REF}$ is the refractive index at the cladding. The second core region 26 (or nano-structured region 26) has minimum refractive index n2, a relative refractive index profile $\Delta2(r)$, a maximum relative refractive index $\Delta2_{MAX}$, and a minimum relative refractive index $\Delta2_{MIN}$, where in some embodiments $\Delta2_{MAX}=\Delta2_{MIN}$. The third core region 28 (or outer, solid portion 28) has a maximum refractive index n3, a relative refractive index profile $\Delta3(r)$ with a maximum relative refractive index $\Delta3_{MAX}$, and a minimum relative refractive index $\Delta3_{MIN}$, where in some embodiments $\Delta3_{MAX}=\Delta3_{MIN}$. In this embodiment the annular cladding 40 has a refractive index n4, a relative refractive index profile $\Delta4(r)$ with a maximum relative refractive index $\Delta4_{MAX}$, and a minimum relative refractive index $\Delta4_{MIN}$. In some embodiments $\Delta4_{MAX}=\Delta4_{MIN}$. In some embodiments, $\Delta1_{MAX}>\Delta4_{MAX}$ and $\Delta3_{MAX}>\Delta4_{MAX}$. In some embodiments $\Delta2_{MIN}>\Delta4_{MAX}$. In the embodiment shown in FIGS. 2 and 3A, $\Delta1_{MAX}>\Delta3_{MAX}>\Delta2_{MAX}>\Delta4_{MAX}$. In this embodiment the refractive indices of the regions have the following relationship n1>n3>n2>n4.

In some embodiments, core regions 22, 28 have a substantially constant refractive index profile, as shown in FIG. 3A with a constant $\Delta1(r)$ and $\Delta3(r)$. In some of these embodiments, $\Delta2(r)$ is either slightly positive ($0<\Delta2(r)<0.1\%$), negative ($-0.1\%<\Delta2(r)<0$), or 0%. In some embodiments the absolute magnitude of $\Delta2(r)$ is less than 0.1%, preferably less than 0.05%. In some embodiments, the outer cladding region 40 has a substantially constant refractive index profile, as shown in FIG. 3A with a constant $\Delta4(r)$. In some of these embodiments, $\Delta4(r)=0\%$. The core section 22 has a refractive index where $\Delta1(r)\geq0\%$. In some embodiments, the void-filled region 26 has a relative refractive index profile $\Delta2(r)$ having a negative refractive index with absolute magnitude less than 0.05%, and $\Delta3(r)$ of the core region 28 can be, for example, positive or zero. In at least some embodiments, n1>n2 and n3>n4.

In some embodiments the cladding 40 has a refractive index $-0.05\%<\Delta4(r)<0.05\%$. In other embodiments, the cladding 40 and the core portions portion 20, 26, and 28 may comprise pure (undoped) silica.

In some embodiments, the cladding 40 comprises pure or F-doped silica. In some embodiments, the cladding 40 comprises pure low index polymer. In some embodiments, nano-structured region 26 comprises pure silica comprising a plurality of voids 32. Preferably, the minimum relative refractive index and the average effective relative refractive index, taking into account the presence of any voids, of nano-structured region 26 are both less than −0.1%. The voids or voids 32 may contain one or more gases, such as argon, nitrogen, oxygen, krypton, or $SO_2$ or can contain a vacuum with substantially no gas. However, regardless of the presence or absence of any gas, the average refractive index in nano-structured region 26 is lowered due to the presence of voids 32. Voids 32 can be randomly or non-periodically disposed in the nano-structured region 26, and in other embodiments, the voids are disposed periodically therein.

In some embodiments, the plurality of voids 32 comprises a plurality of non-periodically disposed voids and a plurality of periodically disposed voids.

In example embodiments, core section 22 comprises germania doped silica, core inner annular region 28 comprises pure silica, and the cladding annular region 40 comprises a glass or a low index polymer. In some of these embodiments, nano-structured region 26 comprises a plurality of voids 32 in pure silica; and in yet others of these embodiments, nano-structured region 26 comprises a plurality of voids 32 in fluorine-doped silica.

In some embodiments, the outer radius Rc of core is greater than 10 μm and less than 600 μm. In some embodiments, the outer radius Rc of core is greater than 30 μm and/or less than 400 μm. For example, Rc may be 125 μm to 300 μm. In other embodiments, the outer radius Rc of the core 20 (please note that in the embodiment shown in FIG. 3A, Rc=R3) is larger than 50 μm and less than 250 μm. The central portion 22 of the core 20 has a radius in the range $0.1Rc\leq R_1\leq0.9Rc$, preferably $0.5Rc\leq R_1\leq09Rc$. The width W2 of the nano-structured ring region 26 is preferably $0.05Rc\leq W2\leq0.9Rc$, preferably $0.1Rc\leq W2\leq0.9Rc$, and in some embodiments $0.5Rc\leq W2\leq0.9Rc$ (a wider nano-structured region gives a higher scattering-induced attenuation, for the same density of nano-sized structures). The solid glass core region 28 has a width Ws=W3 such that $0.1Rc>W3>0.9Rc$. Each section of the core 20 comprises silica based glass. The radial width $W_2$ of nano-structured region 26 is preferably greater than 1 μm. For example, $W_2$ may be 5 μm to 300 μm, and preferably 200 μm or less. In some embodiments, $W_2$ is greater than 2 μm and less than 100 μm. In other embodiments, W2 is greater than 2 μm and less than 50 μm. In other embodiments, $W_2$ is greater than 2 μm and less than 20 μm. In some embodiments, $W_2$ is at least 7 μm. In other embodiments, $W_2$ is greater than 2 μm and less than 12 μm. The width $W_3$ of core region 28 is (R3−R2) and its midpoint $R_{3MID}$ is (R2+R3)/2. In some embodiments, $W_3$ is greater than 1 um and less than 100 μm.

The numerical aperture (NA) of fiber 12 is preferably equal to or greater than the NA of a light source directing light into the fiber. Preferably the numerical aperture (NA) of fiber 12 is greater than 0.2, in some embodiments greater than 0.3, and even more preferably greater than 0.4.

In some embodiments, the core outer radius R1 of the first core region 22 is preferably not less than 24 μm and not more than 50 μm, i.e. the core diameter is between about 48 and 100 μm. In other embodiments, R1>24 microns; in still other embodiments, R1>30 microns; in yet other embodiments, R1>40 microns.

In some embodiments, $|\Delta_2(r)|<0.025\%$ for more than 50% of the radial width of the annular inner portion 26, and in other embodiments $|\Delta_2(r)|<0.01\%$ for more than 50% of the radial width of region 26. The depressed-index annular portion 26 begins where the relative refractive index of the cladding first reaches a value of less than −0.05%, going radially outwardly from the centerline. In some embodiments, the cladding 40 has a relative refractive index profile $\Delta4(r)$ having a maximum absolute magnitude less than 0.1%, and in this embodiment $\Delta4_{MAX}<0.05\%$ and $\Delta4_{MIN}>-0.05\%$, and the depressed-index annular portion 26 ends where the outermost void is found.

Cladding structure 40 extends to a radius R4, which is also the outermost periphery of the optical fiber. In some embodiments, the width of the cladding, R4−R3, is greater than 20

µm; in other embodiments R4−R3 is at least 50 µm, and in some embodiments, R4−R3 is at least 70 µm.

In another embodiment, the entire core 20 is nano-structured (filled with voids, for example), and the core 20 is surrounded by the cladding 40. The core 20 may have a "step" refractive index delta, or may have a graded core profile, with α-profile having, for example, α-value between 1.8 and 2.3.

Preparation of an optical preform (not shown) used to form fibers 12 was formed in one exemplary embodiment wherein 470 grams of $SiO_2$ (0.5 g/cc density) soot are deposited via outside vapor deposition (OVD) onto a fully consolidated 1 meter long, 20 mm diameter pure silica void-free core cane, resulting in a preform assembly (sometimes referred to as a preform, or an optical preform) comprising a consolidated void-free silica core region which was surrounded by a soot silica region. The soot cladding of this perform assembly was then sintered as follows. The preform assembly was first dried for 2 hours in an atmosphere comprising helium and 3 percent chlorine (all percent gases by volume) at 1100° C. in the upper-zone part of the furnace, followed by down driving at 200 mm/min (corresponding to approximately a 100° C./min temperature increase for the outside of the soot preform during the downdrive process) through a hot zone set at approximately 1500° C. in a 100 percent $SO_2$ (by volume) sintering atmosphere. The preform assembly was then down driven again (i.e., a second time) through the hot zone at the rate of 100 mm/min (corresponding to an approximately 50° C./min temperature increase for the outside of the soot preform during the downdrive process). The preform assembly was then down driven again (i.e., a third time) through the hot zone at the rate of 50 mm/min (corresponding to an approximately 25° C./min temperature increase for the outside of the soot preform during the downdrive process). The preform assembly was then down driven again (i.e., a fourth time) through the hot zone at the rate of 25 mm/min (corresponding to an approximately 12.5° C./min temperature increase for the outside of the soot preform during the downdrive process), then finally sintered at 6 mm/min (approximately 3° C./min heat up rate) in order to sinter the soot into an $SO_2$-seeded silica overclad preform. Following each downdrive step, the preform assembly was updriven at 200 mm/min into the upper-zone part of the furnace (which remained set at 1100° C.). The first series of higher downfeed rate are employed to glaze the outside of the optical fiber preform, which facilitates trapping of the gases in the preform. The preform was then placed for 24 hours in an argon purged holding oven set at 1000° C. to outgas any remaining helium in the preform. This preform was then redrawn in an argon atmosphere on a conventional graphite redraw furnace set at approximately 1700° C. into void-free $SiO_2$ core, $SO_2$-seeded (i.e., containing the non-periodically located voids containing $SO_2$ gas) silica overclad canes which were 10 mm in diameter and 1 meter long.

One of the 10 mm canes was placed back in a lathe where about 190 grams of additional $SiO_2$ (0.52 g/cc density) soot was deposited via OVD. The soot of this cladding (which may be called overcladding) for this assembly was then sintered as follows. The assembly was first dried for 2 hours in an atmosphere consisting of helium and 3 percent chlorine at 1100° C. followed by down driving at 5 mm/min through a hot zone set at 1500° C. in a 100% helium (by volume) atmosphere in order to sinter the soot to a germania containing void-free silica core, silica $SO_2$-seeded ring (i.e. silica with voids containing $SO_2$), and void-free overclad preform. The preform was placed for 24 hours in an argon purged holding oven set at 1000° C. to outgas any remaining helium from the preform. The optical fiber preform was drawn to 3 km lengths of 125 micron diameter optical fiber at approximately 1900° C. to 2000° C. in a helium atmosphere on a graphite resistance furnace. The temperature of the optical preform was controlled by monitoring and controlling the optical fiber tension; in this embodiment the fiber tension was held at one value between 30 and 600 grams during each portion (e.g., 3 km lengths) of a fiber draw run. The fiber was coated with a low index silicon based coating during the draw process.

Another 10 mm void-free silica core $SO_2$-seeded silica overclad canes described above (i.e., a second cane) was utilized to manufacture the optical preform and fibers for examples shown in FIG. 4B. More specifically, the second 10 mm void-free silica core $SO_2$-seeded silica overclad cane was placed back in a lathe where about 3750 grams of additional $SiO_2$ (0.67 g/cc density) soot are deposited via OVD. The soot of this cladding (which may be called overcladding for this assembly) was then sintered as follows. The assembly was first dried for 2 hours in an atmosphere comprising of helium and 3 percent chlorine at 1100° C., followed by down driving at 5 mm/min through a hot zone set at 1500° C. in a 100% helium (by volume) atmosphere in order to sinter the soot so as to produce preform comprising germania containing void-free silica core, silica $SO_2$-seeded ring (i.e. silica with voids containing $SO_2$), and void-free overclad. The resultant optical fiber preform was placed for 24 hours in an argon purged holding oven set at 1000° C. to outgas any remaining helium from the preform. Finally, the optical fiber preform was drawn to 5 km lengths of 125 micron diameter optical fiber and coated with the low index polymer as described above.

Figure 3B:
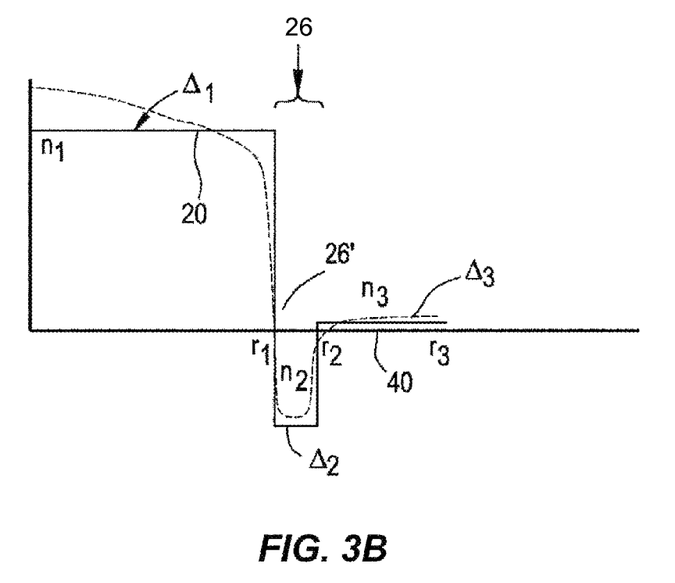
FIG. 3B is a schematic illustration of relative refractive index plot versus fiber radius for another exemplary embodiment of light-diffusing optical fiber.

FIG. 3B illustrates schematically yet another exemplary embodiment of fiber 12. The fiber 12 of FIG. 3B includes a core 20 with a relative refractive index $\Delta_1$, a nano-structured region 26' situated over and surrounding the core 20. The core 20 may have a "step" index profile, or a graded core profile, with α-profile having, for example, α-value between 1.8 and 2.3.

In this exemplary embodiment (see FIG. 3B) the nano-structured region 26' is an annular ring with a plurality of voids 32. In this embodiment, the width of region 26' can be as small as 1-2 um, and may have a negative average relative refractive index $\Delta_2$. Cladding 40 surrounds the nano-structured region 26'. The (radial) width of cladding 40 may be as small as 1 µm, and the cladding may have either a negative, a positive or 0% relative refractive index, (relative to pure silica).

The main difference between examples in FIGS. 3A and 3B is that nano-structured region in shown in FIG. 3A is located in the core 20 and in FIG. 3B it is located at the core/clad interface. The depressed-index annular portion 26' begins where the relative refractive index of the core first reaches a value of less than −0.05%, going radially outwardly from the centerline. In the embodiment of FIG. 3B, the cladding 40 has a relative refractive index profile $\Delta 3(r)$ having a maximum absolute magnitude less than 0.1%, and in this embodiment $\Delta 3_{MAX}<0.05\%$ and $\Delta 3_{MIN}>-0.05\%$, and the depressed-index annular portion 26 ends where the outmost void occurs in the void-filled region.

In the embodiment shown in FIG. 3B the index of refraction of the core 20 is greater than the index of refraction n2 of the annular region 26', and the index of refraction n1 of the cladding 40 is also greater than the index of refraction n2.

Figure 3C:
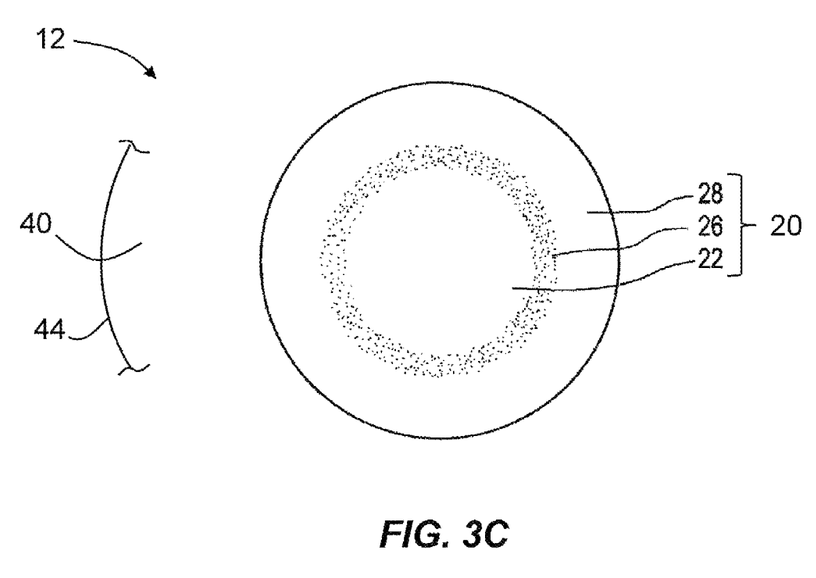
FIG. 3C is illustrates an exemplary configuration of the glass core of the light-diffusing optical fiber.

FIG. 3C is a schematic cross-sectional view of an example core 20 of fiber 12 representative of an actual fiber that was fabricated. With reference also to FIG. 2, core 20 of FIG. 3C has a first core region 22 with an outer radius R1 of about 33.4 µm, a nano-structured region 26 with an outer radius R2=42.8 µm, a third core region 28 with an outer radius R3=62.5 µm, and a polymer cladding 40 (see FIG. 2) with an outer radius R4 (not shown) of 82.5 μm. In this embodiment, the material of the core is pure silica (undoped silica), the material for cladding was low index polymer (e.g., UV curable silicone having a refractive index of 1.413 available from Dow-Corning of Midland, Mich. under product name Q3-6696) which, in conjunction with the glass core, resulted in fiber NA of 0.3. The optical fiber 12 had a relatively flat (weak) dependence on wavelength, compared to standard single-mode transmission fiber, such as for example SMF-28® fiber, as represented in FIG. 4B. In standard single mode (such as SMF-28®) or multimode optical fibers, the losses at wavelengths less than 1300 nm are dominated by Rayleigh scattering. These Rayleigh scattering losses are determined by the properties of the material and are typically about 20 dB/km for visible wavelengths (400-700 nm). The wavelength dependence of Rayleigh scattering losses is proportional to $\lambda^{-p}$ with p≈4. The exponent of the wavelength dependent scattering losses in the fiber comprising at least one nanostructured region is less than 2, preferably less than 1 over at least 80% (for example greater than 90%) in the 400 nm-1100 nm wavelength range. The average spectral attenuation from 400 nm to 1100 nm was about 0.4 dB/m when the fiber was drawn with at 40 g tension and was about 0.1 dB/m when the fiber 12 was drawn at 90 g tension. In this embodiment, the nano-sized structures contain $SO_2$ gas. Applicants found that filled $SO_2$ voids in the nano-structured ring greatly contribute to scattering. Furthermore, when $SO_2$ gas was used to form the nano-structures, it has been discovered that this gas allows a thermally reversible loss to be obtained, i.e., below 600° C. the nano-structured fiber scatters light, but above 600° C. the same fiber will guide light. This unique behavior that $SO_2$ imparts is also reversible, in that upon cooling the same fiber below 600° C., the fiber 12 will act as light-diffusing optical fiber and will again generate an observable scattering effect.

In preferred embodiments, the uniformity of illumination along the fiber length is controlled such that the minimum scattering illumination intensity is not less than 0.7 of the maximum scattering illumination intensity, by controlling fiber tension during the draw process; or by selecting the appropriate draw tension (e.g., between 30 g and 100 g, or between 40 g and 90 g).

Accordingly, according to some embodiments, a method of making fiber 12 to control uniformity of illumination along the fiber length wherein the minimum scattering illumination intensity is not less than 0.7 the maximum scattering illumination intensity includes the step of controlling fiber tension during draw process.

The presence of the nano-sized structures 32 in fiber 12 (see FIG. 2) creates losses due to optical scattering, and the light scattering through the outer surface of the fiber can be used for illumination purposes. FIG. 4A is a plot of the attenuation (loss) in dB/m versus wavelength (nm) for the fiber of FIG. 3C (fiber with $SO_2$ gas filled voids). FIG. 4A illustrates that (i) fibers 12 can achieve very large scattering losses (and thus can provide high illumination intensity) in the visible wavelength range. The scattering losses of fiber 12 also have weak wavelength dependence ($L_s$ is proportional to $1/\lambda^{-p}$, where p is less than 2, preferably less than 1, and even more preferably less than 0.5), as compared to regular 125 μm graded index core multi mode comparative fiber A (fiber A is a step index multimode fiber without the nano-structured region) which has Rayleigh scattering losses of about 0.02 dB/m in the visible wavelength range, or about 20 dB/km at the wavelength of 500 nm and relatively strong wavelength dependence of $1/\lambda^4$). The effect of the tension for the fibers 12 is also illustrated in FIGS. 4A-4B. More specifically FIGS. 4A-4B illustrate that the higher fiber draw tension results in lower scattering losses, and that lower fiber draw tension results in a fiber section with higher scattering loss, i.e., stronger illumination.

FIG. 4A depicts attenuation as function of wavelength for fiber 12 (with voids in the core) drawn at different fiber tensions of 90 and 400 g. FIG. 4B depicts attenuation as function of wavelength for different light-diffusing optical fiber 12 (with voids in the core) drawn at different fiber tension, 90 and 40 g, a comparative multi mode fiber (fiber A) with normalized loss, and a theoretical fiber with $1/\lambda$ loss dependence. Note, the graph of FIG. 4B describes wavelength dependence of the loss. In this example, in order to compare the slope of the scattering for fiber 12 and fiber A, the loss of low-loss fiber (fiber A) was multiplied by a factor of 20, so that the two plots can be easily shown on the same figure.

Without being bound to any particular theory, it is believed that the increase in the scattering losses when the draw tension decreases, for example from 90 g to 40 g, is due to an increase in the average diameter of the nanostructures. Therefore, this effect of fiber tension could be used to produce constant attenuation (illumination intensity) along the length of the fiber by varying the fiber tension during the draw process. For example, a first fiber segment drawn at high tension, T1, with a loss of $\alpha_1$ dB/m and length, L1, will attenuate the optical power from an input level P0 to P0 exp($-\alpha_1$*L1/4.343). A second fiber segment optically coupled to the first fiber segment and drawn at lower tension T2 with a loss of $\alpha_2$ dB/m and length L2 will further attenuate the optical power from P0 exp($-\alpha_1$*L1/4.343) to P0 exp($-\alpha_1$*L1/4.343) exp($-\alpha_2$*L2/4.343). The lengths and attenuations of the first and second fiber segments can be adjusted to provide uniform intensity along the length of the concatenated fiber. One of the advantages of fibers 12 is their ability to provide uniform illumination along their length.

Modular Illumination Systems

Figure 5:
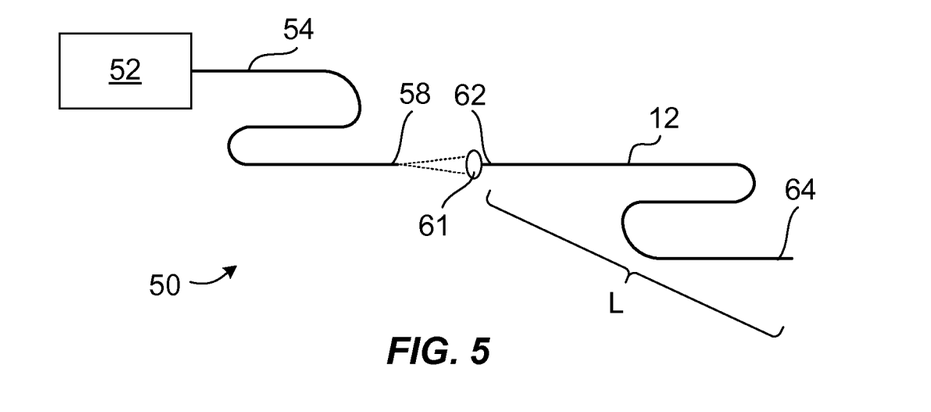
FIGS. 5 and 6 diagrammatic representations of embodiments of an illumination systems in which the fibers of the present disclosure may be used.
Figure 6:
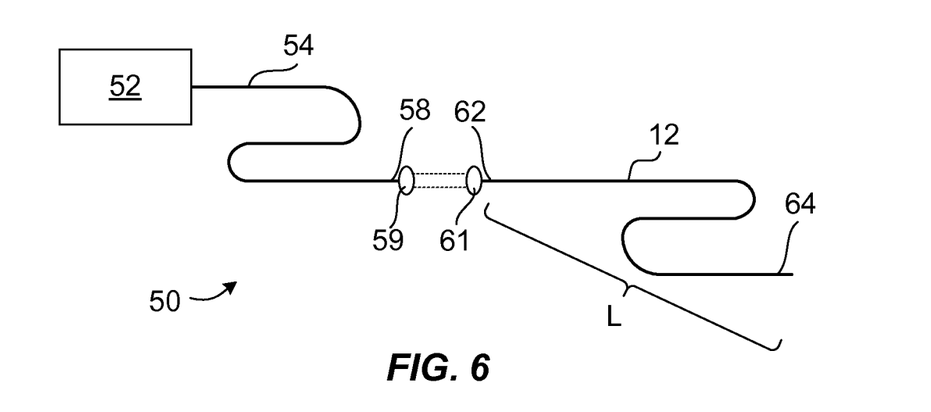

In FIGS. 5 and 6 is shown diagrammatically certain embodiments of an illumination system 50. The illumination system 50 includes at least one light source 52 that generates light having at least one wavelength between 200 nm and 2000 nm. The system 50 further includes at least one low-scatter light-conducting optical fiber 54 with an input end optically coupled to the at least one light source 52 and with an output end 58. The at least one low-scatter light-conducting optical fiber 54 is configured to provide the light received from the at least one light source 52 to the output end 58 as guided light.

The system 50 further includes at least one light-diffusing optical fiber 12 having a glass core 20, a cladding 40 surrounding the core 20, and a plurality of nano-sized structures 32 situated within said core 20 or at a core-cladding boundary (see FIGS. 1-4). The at least one light-diffusing optical fiber 12 further includes an outer surface 48, and an input end 62. The input end 62 of the at least one light-diffusing optical fiber 12 optically—and preferably removably—coupled to the output end 58 of the at least one low-scatter light-conducting optical fiber 54, by means of an integral lens 61 at the input end 62 of the light-diffusing optical fiber 12 as in FIG. 5, or by means of both an integral lens 59 at the output end 58 of the light-conducting optical fiber 54 and an integral lens 61 at the input end 62 of the light-diffusing optical fiber 12, as in FIG. 6. The at least one light-diffusing optical fiber 12 is configured to receive the guided light from the low-scatter light-conducting optical fiber 54 and scatter at least a portion of said guided light via said nano-sized structures 32 away from the glass core 20 and through the outer surface 48 (See FIGS. 1-4), to form an emitting light-diffusing optical fiber 12 having at least one continuous length L over which scattered light is emitted. One or more additional fibers not shown, of light-conducting and/or light-scattering types, may be optically coupled to an output end 64 of the light-scattering fiber to form additional continuous lengths (not shown) within the illumination system 50 over which scattered light is emitted.

According to some embodiments of the present disclosure, particular for illumination applications requiring visible light, the light source 52 may be a white light source, a colored light source, or a variable color light source, among others. For marking or signaling applications, among others, the light source 52 may be an infrared source. In such embodiments the at least one light-diffusing fiber 12 would typically not incorporate phophors.

According to other embodiments of the present disclosure, the light source 52 produces only wavelengths of 500 nm or less, that is, the light source 52 is an "ultraviolet" source. Such embodiments are particularly useful in creating highly varied or highly variable illumination systems using a single source 52 or only a few sources 52, since by using various phosphors in connection with the associated light diffusing fibers (such as phosphors coated on or even positioned within the fibers, for instance), many different frequencies of light may be produced from initial UV light, including infrared light and various colors or frequency combinations of visible light.

Light-Diffusing Fiber with Integrated or Integral Lenses

Figure 7:
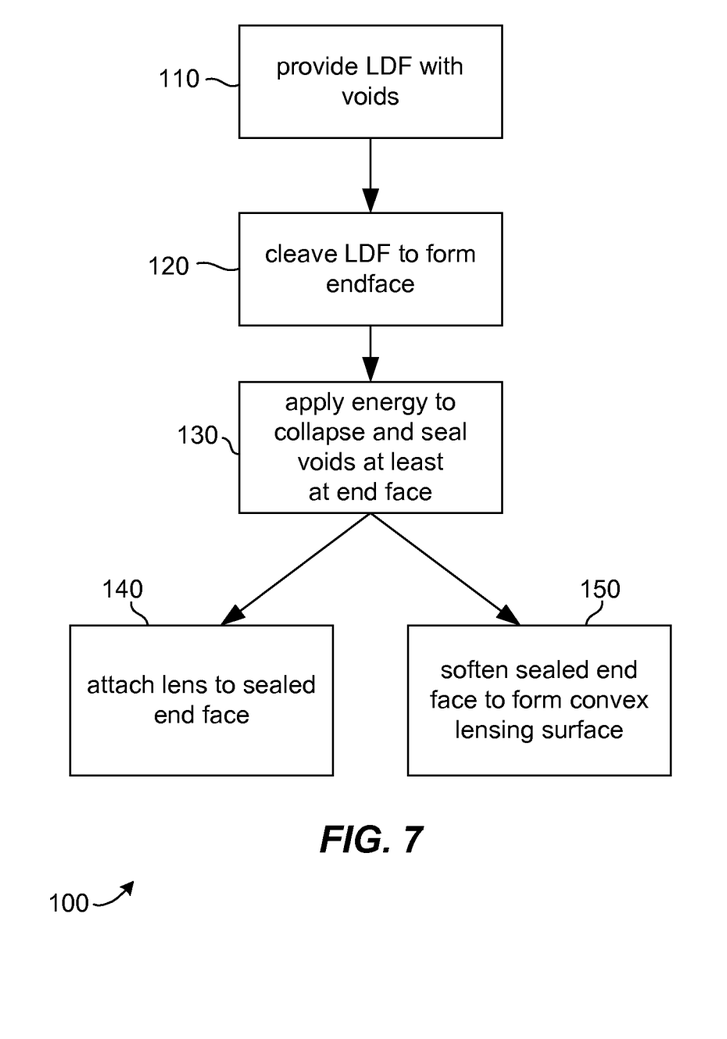
FIG. 7 is a flow diagram showing the main steps of a process or method according to one aspect of the present disclosure for forming light-diffusing fibers with integrated or integral lenses.
Figure 9:
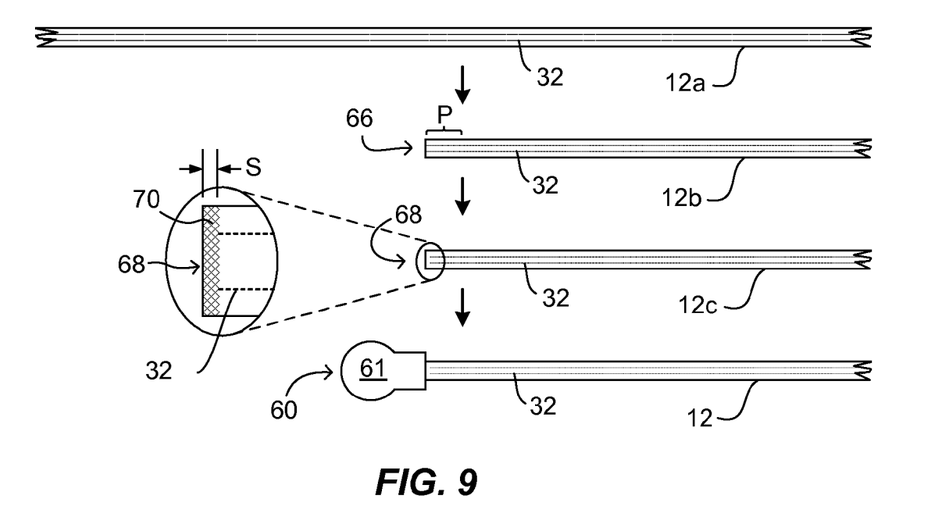
FIGS. 9 and 10 are diagrammatic cross-sectional representations of methods or processes according to the flow diagram of FIG. 7.
Figure 10:
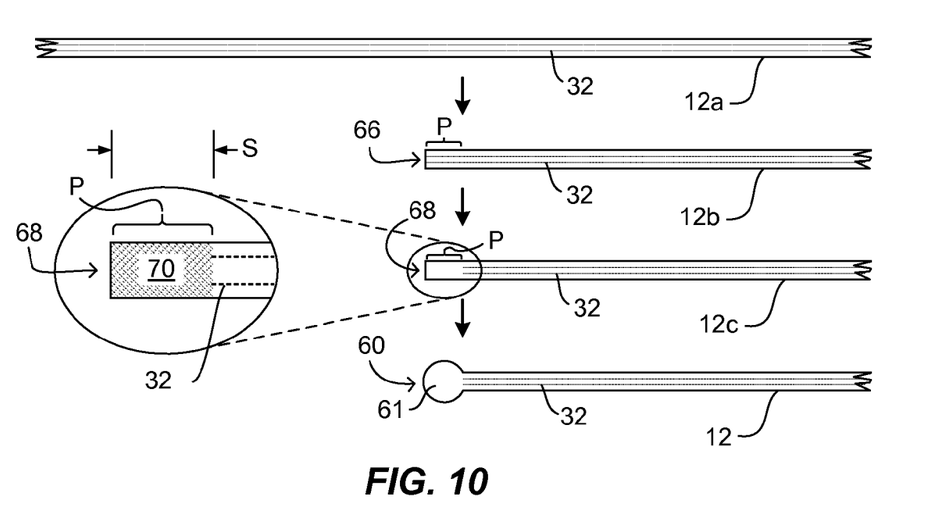

FIG. 7 is a flow diagram showing the main steps of process or method 100, according to one aspect of the present disclosure, for forming light-diffusing fibers with integrated or integral lenses. As seen in the flow diagram of FIG. 7, and as represented in FIGS. 9 and 10 in multiple successive cross-sections of a fiber 12 (12a, 12b, 12c and 12) being processed according to the method 100, the method 100 includes a step 110 of providing a light-diffusing fiber ("LDF") 12a. The light diffusing fiber 12a, as shown and discussed above with respect to fiber 12 of FIGS. 1-4, has a core 20 and a cladding 40 with a core-cladding boundary therebetween and plurality of nano-sized structures 32 situated within said core or at the core-cladding boundary.

The method 100 further includes the step 120 of cleaving the light-diffusing fiber 12a, thereby forming a cleaved end face 66 on the fiber 12b, and the step 130 of applying energy to one or more of 1) the cleaved end face 66 and 2) the light-diffusing fiber 12b along a portion P of the length thereof (shown on the magnified inset of the fiber 12c of FIG. 10) adjacent the cleaved end face 66, with the amount of energy applied being sufficient to collapse and seal the voids 32 exposed at the cleaved end face 66, leaving a sealed cleaved end face 68. This results in a sealed or collapsed region 70 (indicated by hash marks) in which voids 32 are absent, extending a distance S along the fiber 12 (12c) from the sealed cleaved end face 68. The step 130 of applying energy may desirably include applying laser energy to the cleaved end face (66).

As shown in FIG. 7, there are alternate steps 140 and 150 in the method 100. According to one alternate step 140, a lens 61 is attached to the sealed end face 68, desirably by a heat fusion process, thus forming an integrated lens 61 on the fiber 12. According to the other alternate step 150, the sealed end face is heat-softened to form a convex lensing surface 60 thus creating an integral lens 61 on the fiber 12.

For the method 100 using step 140 (attaching a lens 61 to the sealed cleaved end face 68), the step 130 of applying energy desirably comprises applying energy directly to the cleaved end face 66 and not directly to said portion P of the length of the fiber (12b) adjacent the cleaved end face 66 (as seen in FIG. 9). This allows for the sealing or collapsing of the voids 32 in a sealed or collapsed region 70 extending only a very limited depth S from the fiber end face 66, forming a sealed cleaved end face 68 with a shallow sealing depth S, desirably as small as 10 μm or less. Controlled sealing at such small depths can be achieved by laser heating of the cleaved end face 66. After sealing, the process may optionally include the step of polishing the cleaved sealed end face 68, particularly if the step 140, attaching a lens to the sealed end face 68, is to be used.

Figure 16:
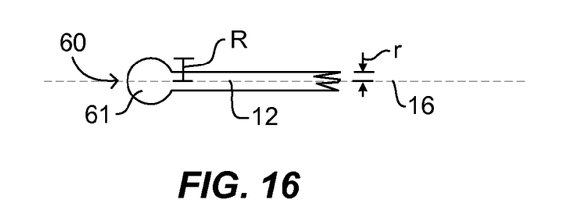

For the method 100 using step 150 (softening the sealed end face 68 to form a convex lensing surface 60) (as seen in FIG. 10), the step of applying energy desirably includes applying one or more of heat and laser energy to the light-diffusing fiber 12 along said portion P of the length thereof adjacent the cleaved end face 66 or the sealed cleaved end face 68. Energy may be applied to the portion P by use of a laser, or by use other suitable heating apparatus, such as a resistive heating element, or even a flame. Applying energy along said portion P preferably results in a sealed region 70 in which the voids 32 are sealed to a depth S of more than 10 μm from the end face 68. For some embodiments, it is desirable to seal the voids 32 to a depth S of more than 100 μm from the end face 68, even 1000 μm. In particular, it is desirable to seal the voids 32 to a sufficient depth S such that the sealed region 70 has a volume about the same as or greater than the lens to be formed. With reference to FIG. 16, for example, where a convex lensing surface 60 of radius R is to be formed, it is desirable to first seal the voids 32 to a sufficient depth S such the sealed region 70 has a volume at about equal or even greater that of a sphere of radius R. This condition is may be met by setting the cylindrical volume of the sealed region 70 equal to the volume of a sphere of radius R, which gives the result that the distance S along the fiber of the sealed portion 70 or the depth S of the sealed portion 70 measured from the end face 68 from the sealed cleaved end face is at least as great as $(4/3)(R^3/r^2)$, where r is the fiber radius (of the glass portion of the fiber) and R is the radius of curvature of the convex lensing surface 60.

As additional variations of the method 100 of FIG. 7, the alternate steps 140 and 150 may optionally be omitted, or the step 150 may be varied such that the softening is only enough to smooth the end face, and not enough to allow formation of a concave surface by surface tension forces. These methods effectively produce a light diffusing fiber with a flat lens or zero power lens at the end face.

Figure 8:
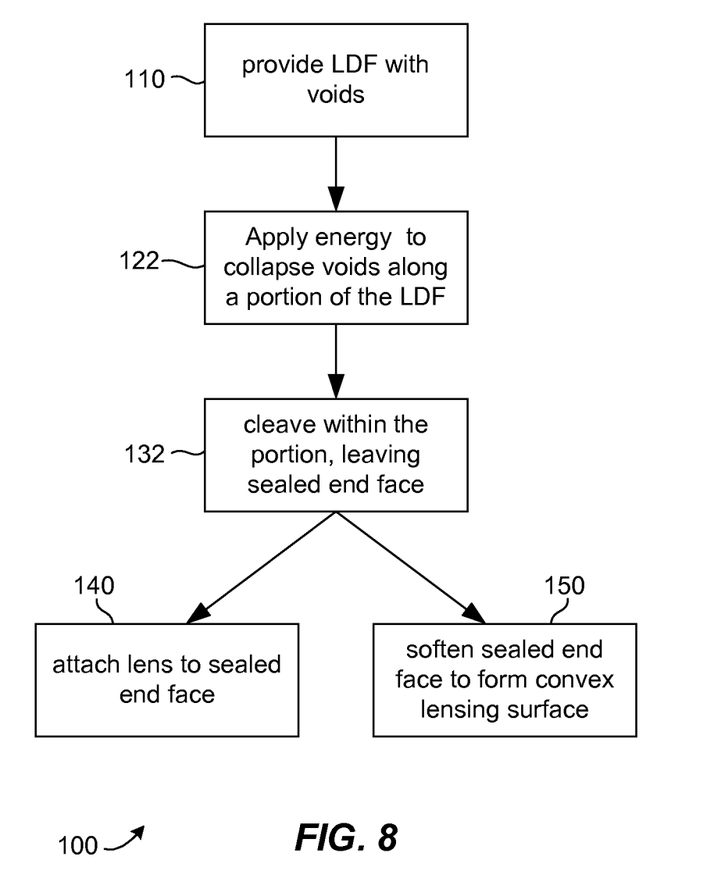
FIG. 8 is a flow diagram showing the main steps of another process or method according to another aspect of the present disclosure for forming light-diffusing fibers with integrated or integral lenses.
Figure 11:
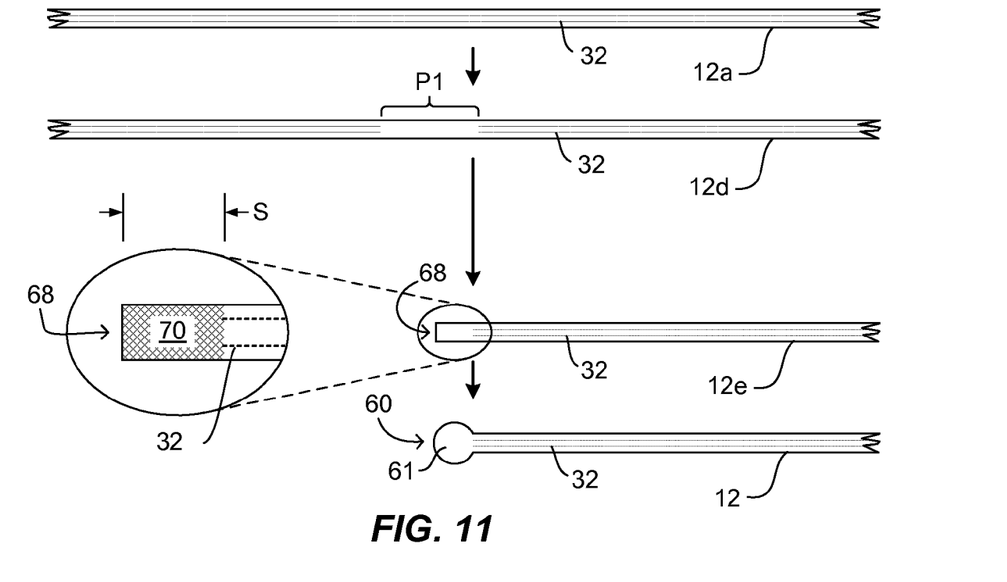
FIG. 11 is a diagrammatic cross-sectional representations of methods or processes according to the flow diagram of FIG. 8.

Still another alternate method according to another aspect of the present disclosure is represented by the flow diagram in FIG. 8 and in the cross sections 12a, 12d, 12e, and 12 of a fiber under processing in FIG. 11. According step 110 of the method or process 100 of FIG. 8, a light-diffusing fiber 12a is provided having a core 20 and a cladding 40 with a core-cladding boundary therebetween and plurality of nano-sized structures in the form of voids 32 situated within said core 20 or at the core-cladding boundary. According to step 122, energy is applied to the light-diffusing fiber 12, along a portion P1 of the length thereof, with the amount of energy being sufficient to collapse and seal the voids 32 along said portion P1 of the length, resulting is a light-diffusing fiber 12d having a sealed portion P1 in which the voids 32 are sealed. According to step 132, the light-diffusing fiber 12 is then cleaved at a position inside said portion P1 of the length, thereby forming a sealed cleaved end face 68 on the light-diffusing fiber 12. The remaining alternate steps 140 and 150 are then the same as in the method of FIG. 7, namely that a lens is attached to the sealed end face 68 according to step 140, desirably by heat fusing, and optionally after polishing of the end face 68, or the sealed end face 68 is softened to directly form a convex lensing surface according to step 150. If desired, as an additional alternative to help assist in collapsing the voids 32 within the portion P1, the method may further include placing the light-diffusing fiber 12 in tension across said portion P1 while performing the step of applying energy. As with the method of FIG. 7, further variations to the method 100 of FIG. 8 include that the alternate steps 140 and 150 may optionally be omitted, or the step 150 may be varied such that the softening is only enough to smooth the end face, and not enough to allow formation of a concave surface by surface tension forces. These variations effectively produce a light diffusing fiber with a flat lens or zero power lens at the end face.

Figure 12:
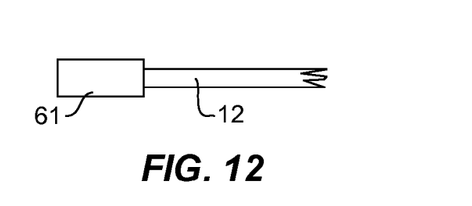
FIGS. 12-17 are diagrams showing various alternative embodiments of fibers with lenses according to the present disclosure.
Figure 13:
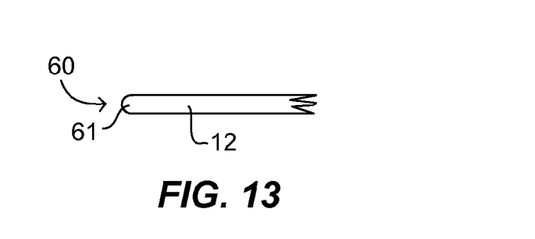
Figure 14:
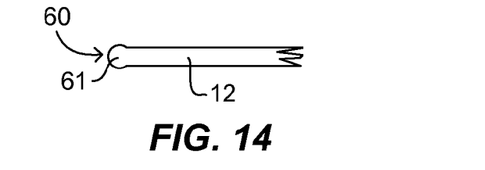
Figure 15:
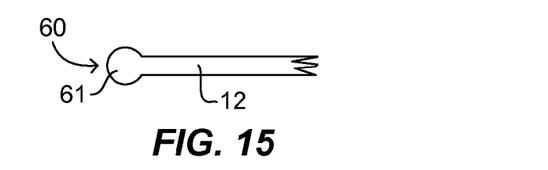
Figure 17:
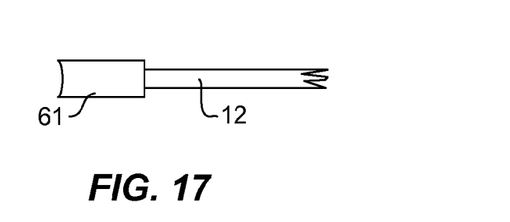

According to yet another aspect of the present disclosure, and with reference to FIGS. 1-4 and 10-11, a light-diffusing fiber 12 has a first end 62 and comprises a glass core 20, a cladding 40 surrounding said core, a plurality of nano-sized structures or voids 32 situated within said core or at a core-cladding boundary; and a lens 61 on said first end 62. The plurality of nano-sized structures 32 are sealed off at or near said first 62 end so as not to extend up to or into said lens 61. The first end 62 of the light diffusing fiber may comprise a sealed cleaved end face 68 having a lens 61 positioned on and fused to said sealed cleaved end face 68. The lens 61 may desirably be a ball lens 61 as in FIGS. 13-16 or a GRIN lens 61 as in FIG. 12, or a flat or zero power lens or even a negative power lens 61 as in FIG. 17. Where a ball lens is desired for the first end 62, the ball lens 61 may be formed from and comprise the sealed end face 68 of the fiber 12 which has been heated so as to form a convex lensing surface 60.

It is to be understood that the foregoing description is exemplary of the disclosure only and is intended to provide an overview for the understanding of the nature and character of the disclosure as it is defined by the claims. The accompanying drawings are included to provide a further understanding of the disclosure and are incorporated and constitute part of this specification. The drawings illustrate various features and embodiments of the disclosure which, together with their description, serve to explain the principals and operation of the disclosure. It will become apparent to those skilled in the art that various modifications to the preferred embodiment of the disclosure as described herein can be made without departing from the spirit or scope of the disclosure as defined by the appended claims.

What is claimed is:

1. A method of providing a light-diffusing fiber having a core and a cladding with a core-cladding boundary therebetween and plurality of nano-sized structures situated within said core at the core-cladding boundary; cleaving the light-diffusing fiber, thereby forming a cleaved end face; and applying energy to one or more of the 1) the cleaved end face and 2) the light-diffusing fiber along a portion of the length thereof adjacent the cleaved end face, the amount of energy being sufficient to collapse and seal the voids exposed at the cleaved end face leaving a sealed cleaved end face, wherein applying energy comprises applying energy to the light-diffusing fiber along a portion of the length thereof adjacent the cleaved end face so as to seal the voids, at the end face, to a depth of more than 10 um; further comprising softening the light-diffusing fiber at or near the sealed end face thereof sufficiently to induce formation of a convex lensing surface on the sealed end face of the fiber; wherein the step of softening comprises inducing formation of a spherical convex lens surface having a radius of length R, when the fiber has a radius, of the glass components of the fiber, of length r, and wherein the step of applying energy comprises apply energy so as to seal the voids to a distance S along the fiber, from the sealed cleaved end face, of at least $S=(R^3/r^2)$.

2. The method according to claim 1 wherein applying energy to the cleaved end face comprises applying laser energy to the cleaved end face.

3. The method according to claim 1 wherein applying energy comprises applying energy directly to the cleaved end face and not directly to said a portion of the length of the fiber adjacent the cleaved end face.

4. The method according to claim 1 wherein applying energy comprises applying energy to the cleaved end face so as to seal the voids to a depth of 10 μm or less.

5. The method according to claim 1, the method further comprising polishing the sealed cleaved end face.

6. The method according to claim 1, the method further comprising affixing a lens to the sealed cleaved end face.

7. The method according to claim 6 wherein affixing a lens comprises heat-fusing a lens to the sealed cleaved end face.

8. The method according to claim 1 wherein applying energy comprises applying one or more of heat and laser energy to the light-diffusing fiber along said portion of the length thereof adjacent the cleaved end face.

9. The method according to claim 1 wherein the energy is applied so as to seal the voids, at the end face, to a depth of more than 1000 μm.

* * * * *